UNITED STATES PATENT OFFICE.

CHARLES W. THOMAS, OF EAST DOWNINGTOWN, PENNSYLVANIA, ASSIGNOR TO SILICA STONE WORKS, OF GLENLOCH, PENNSYLVANIA, A CORPORATION OF PENNSYLVANIA.

PROCESS OF MAKING VITRIFIED OBJECTS.

1,144,395.     Specification of Letters Patent.     Patented June 29, 1915.

No Drawing.     Application filed November 16, 1911. Serial No. 660,695.

*To all whom it may concern:*

Be it known that I, CHARLES W. THOMAS, a citizen of the United States, and a resident of East Downingtown, Chester county, Pennsylvania, have invented an Improved Process of Making Vitrified Objects, of which the following is a specification.

One object of this invention is to provide a novel process by which it shall be possible to produce vitrified objects such as bricks, tiles, insulators and the like of a comparatively hard, tough, non-absorbent and acid proof nature and possessed of a smooth, ornamental, surface.

Another object is to provide a process for producing objects having the above noted characteristics, which shall be commercially practical, economical, and efficient under operating conditions.

The raw materials employed for my process preferably consist of silica-sand and glass or feldspar or the like, and when glass is used the proportions are approximately 66 parts of sand to 34 parts of glass by weight, although it is to be understood that these relative amounts may be varied to some extent without departing from my invention, depending on the composition and fineness of the materials, the temperature at which the clots are heated, etc. In place of the above materials any refractory mineral earth containing a fusible material may be used as the raw material in my process. These raw materials are prepared preferably by grinding so that the silica-sand may pass through a sieve of 10 meshes to the inch in which event there is usually from 25 per cent. to 50 per cent. of this sand in a pulverized condition. If glass is used it should be reduced to an impalpable powder or completely pulverized. The ingredients in substantially the proportions noted should be intimately mixed together with about 6 parts by weight of water and should then be subjected to heavy compression whereby the mixture is formed into clots which in the case of bricks, should be made with their faces slightly less in width, and a thickness slightly greater, than is desired in the finished product in order that they may properly enter a mold box though they may be made otherwise without departing from my invention.

The clots so formed by means of the heavy compression are self-supporting and retain their shape; while their constituents occupy a minimum volume and possess voids of the minimum number and size. These clots are then thoroughly dried; it being noted that such drying must be such as to drive off all free water if the compression be such as to reduce the volume of the clot to a minimum or to such pressure as will entrap the water. It is of course obvious that such complete drying is not necessary when the clots are not so highly compressed. The clots are afterward subjected for a period depending largely on their thickness to a vitrifying heat at a temperature which preferably gradually increases from about 1800° F. to about 2100° F., during which time and coinciding with the rise in temperature the clots are subjected first to an oxidizing flame in order to raise them to the desired temperature without causing distortion and then to a reducing flame or heat so as to soften their surfaces, the former condition continuing for example in the case of clots $8''x3\frac{1}{2}''x2\frac{1}{2}''$, for standard building brick, which would require an hour of heating, for the first 45 minutes of the heat and the latter condition for the last 15 minutes thereof.

The furnace used in this part of my invention is preferably of the form described and claimed in my Patent No. 989,443 dated April 11th, 1911; being provided with an annular heating chamber within which is a revolving hearth.

This furnace is usually heated with a fuel such as oil or gas, which, with air, is so fed into the heating chamber that the combustible gases produced are moved at a high speed in one direction within the same. It is of course obvious that other sources of heat may be used without departing from my invention.

The previously dried clots are charged at regular intervals upon the hearth and the change from an oxidizing to a reducing flame is made by varying the relative proportions of air and fuel delivered to the furnace. As will be understood by those skilled in this art, the clots become plastic as a result of this heating and to prevent them adhering to the hearth, the latter is covered with a layer of silica sand or other refractory material upon which said clots are placed. At the expiration of the above time in the example considered the clots are discharged from the furnace in a plastic condition directly into the mold box of a press, and as nearly as possible without being permitted to cool below the furnace temperature at this point; the mold with the plungers coöperating therewith being maintained at or near a dull red heat (1000° F. to 1200° F.) or as much higher as the metal of various parts will stand.

The necessary plasticity of the outer surface of the clot is thus maintained during the operation of the press, which exerts upon the clots a pressure primarily formative;—that is to say, there is but little or no reduction in the volume of the hot clot owing to the action of this press. After ejection from the hot press the finished brick or other object is delivered into a pan or onto a plate or carrier within the hot end of an annealing leer and is slowly and uniformly cooled, in its progress through the leer; the temperature of said hot end of the leer being from 900° F. to 1300° F.

It is of course to be understood that other proportions of sand and glass may be used without departing from my invention, although I preferably employ these materials in the proportion noted.

For securing an increased economy in heating as well as to give greater control of the oxidation and reduction, I may hollow the clots before they are fed to the furnace; the thinner walls reaching a vitrifying temperature in less time than if solid clots were used, and for the purpose of securing more uniform cooling and annealing of the finished bricks or other objects I may hollow or perforate them.

I claim:

1. The process of making vitrified objects which consists in subjecting a mixture of a liquid, and vitrifiable material to relatively heavy pressure to form self-sustaining clots; heating the clots to a vitrifying temperature; and thereafter subjecting them to a formative pressure less than that first exerted upon them to give them their final form and insufficient to materially reduce their volume.

2. The process of making vitrified objects, which consists in subjecting clots formed of vitrifiable material to a temperature gradually increasing from or about 1800° F. to or about 2100° F. and thereafter compressing the clots into final form; said heating being part of the time under oxidizing conditions and for another part of the time under reducing conditions.

3. The process of making vitrified objects, which consists in subjecting the clots formed of vitrifiable material first to an oxidizing heat and then to a reducing heat, and thereafter compressing the said clots to their final form.

4. The process of making vitrified objects, which consists in subjecting a mixture of a liquid and vitrifiable material to pressure to form self-sustaining clots; heating said clots for a predetermined time to a vitrifying temperature and thereafter compressing the clots into final form without substantially reducing their volume.

5. The process which consists in mixing about 6 parts of water with about 66 parts of sand and about 34 parts of glass; subjecting said mixture to a relatively heavy compression to form clots; drying said clots for a predetermined time to a temperature increasing from or about 1800° F. to or about 2100° F.; said heating being first under oxidizing conditions and thereafter under reducing conditions; pressing said clots into their final forms without substantial reduction of volume.

6. The process which consists in mixing about 6 parts of water with about 66 parts of sand and about 34 parts of glass; subjecting said mixture to a relatively heavy compression to form clots; drying said clots; heating said clots for a predetermined time to a temperature increasing from or about 1800° F. to or about 2100° F.; and pressing said clots to their final forms without substantial reduction of volume.

7. The process which consists in subjecting a clot containing silica sand and a mineral substance containing a base to the action of an oxidizing flame until constituents of said basic material have been oxidized.

8. The process which consists in subjecting a clot containing a mineral substance containing a base first to an oxidizing influence comprising the use of heat and then to a reducing influence comprising the use of heat.

9. The process which consists in pressing a finely pulverized composition comprising an acid mineral substance and a mineral substance containing a base into a shape having a high degree of density, subjecting the shape thus formed to the action of an oxidizing flame until the desired physical and chemical changes have been effected, and subjecting said heated shape to forming pressure.

10. The process which consists in subjecting a consolidated shape comprising a pulverized acid material and a pulverized material containing a base to the action of an oxidizing flame and thereafter to the action of a reducing flame.

11. The process which consists in pressing a mixture of pulverized acid material and material containing a base into a desired shape, heating said shape by an oxidizing flame for a period sufficient to effect a reaction throughout its mass, and then subjecting said shape to the action of a reducing flame for a shorter period.

12. The process which consists in pressing a composition comprising moistened pulverized silica sand and glass into a shape sufficiently firm to be handled, subjecting said shape to the action of an oxidizing flame until it has become plastic throughout its mass, and forming said heated shape by pressure.

13. The process which consists in combining by weight two parts of pulverized silica sand with one part of glass and sufficient water to effect adhesion by pressure, pressing the composition into a shape that can be handled, subjecting said shape to the action of an oxidizing flame, and pressing the heated shape to form.

14. The process which consists in combining pulverized silica sand, glass, a cementitious material and water; pressing the composition thus formed into shape; heating said shape to plasticity, and pressing said heated shape to form.

15. The process which consists in subjecting a finely ground composition containing an acid mineral substance and a mineral substance containing a base to pressure sufficiently high to bring the particles into the closest practicable contact with the production of a shape that can be handled, subjecting said shape to the action of an oxidizing flame until reaction has been effected throughout its mass, thereafter subjecting said shape to the action of a reducing flame for sufficient time to communicate its reducing influence through the outer surface of the mass, and then subjecting said shape while in plastic condition to a forming pressure.

16. The process which consists in subjecting a clot containing silica sand and a mineral substance containing a base to an oxidizing flame until said substance becomes plastic.

In testimony whereof, I have signed my name to this specification, in the presence of two subscribing witnesses.

CHARLES W. THOMAS.

Witnesses:
   CHAS. W. GRAHAM,
   JOS. H. KLEIN.